(12) United States Patent
Ninomiya et al.

(10) Patent No.: US 6,391,959 B1
(45) Date of Patent: May 21, 2002

(54) PHENOLIC RESIN COMPOSITION FOR FIBER-REINFORCED COMPOSITE MATERIAL, PREPREG FOR FIBER-REINFORCED COMPOSITE MATERIAL, AND PROCESS FOR PRODUCING PREPREG FOR FIBER-REINFORCED COMPOSITE MATERIAL

(75) Inventors: Hiroaki Ninomiya, Matsuyama; Nobuyuki Tomioka, Niigata; Takeshi Terashita, Iyo; Hideo Nagata, Ootsu; Hajime Kishi, Matsuyama, all of (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/355,646

(22) PCT Filed: Dec. 1, 1998

(86) PCT No.: PCT/JP98/05410

§ 371 (c)(1),
(2), (4) Date: Aug. 2, 1999

(87) PCT Pub. No.: WO99/28383

PCT Pub. Date: Jun. 10, 1999

(30) Foreign Application Priority Data

Dec. 3, 1997 (JP) .............................................. 9-332909
May 26, 1998 (JP) ........................................... 10-143736
May 28, 1998 (JP) ........................................... 10-147219

(51) Int. Cl.[7] ................................................ C08K 3/04
(52) U.S. Cl. ........................ 524/495; 524/496; 524/540; 525/132
(58) Field of Search ................................ 524/495, 496, 524/540; 525/132

(56) References Cited

U.S. PATENT DOCUMENTS 5,593,780 A * 1/1997 Yap .............................. 428/392

* cited by examiner

Primary Examiner—Edward J. Cain
(74) Attorney, Agent, or Firm—Schnader Harrison Segal & Lewis LLP

(57) ABSTRACT

The phenolic resin composition for fiber-reinforced composite materials of the invention comprises at least the following constituent elements A and B of a thermoplastic resin:

A: phenolic resin,
B: at least one thermoplastic resin selected from polyvinyl formals, polyvinyl acetals, polyvinyl butyrals, polyvinyl pyrrolidones, polyvinyl acetates, polyvinyl alcohols, polyethylene glycols, copolymerized nylons and dimer acid polyamides.

The resin composition is filmwise applied to reinforcing fibers, and the resulting film is heated under pressure whereby it is impregnated into the reinforcing fibers to give a prepreg for fiber-reinforced composite materials.

30 Claims, No Drawings

PHENOLIC RESIN COMPOSITION FOR FIBER-REINFORCED COMPOSITE MATERIAL, PREPREG FOR FIBER-REINFORCED COMPOSITE MATERIAL, AND PROCESS FOR PRODUCING PREPREG FOR FIBER-REINFORCED COMPOSITE MATERIAL

TECHNICAL FIELD

The present invention relates to a phenolic resin composition for fiber-reinforced composite materials, of which the prepreg has good releasability and which has good drapability; to a prepreg for fiber-reinforced composite materials, which comprises the composition as the matrix resin; and to a method for producing the prepreg for fiber-reinforced composite materials.

BACKGROUND ART

Owing to high specific strength and high specific rigidity of the reinforcing fibers therein, fiber-reinforced composite materials have heretofore been used for aircraft materials. These days, their applications are being much developed not only for aircraft materials but also for sports and leisure goods and for general-purpose industrial materials including those for vehicles and ships and even for civil engineering and construction, etc. With the development of their applications for such general-purpose industrial materials, fiber-reinforced composite materials are being required to have much improved flame-retardant characteristics of firing retardancy and smoking retardancy.

As the matrix resin for prepregs for fiber-reinforced composite materials, widely used are epoxy resins having good moldability and high mechanical strength. However, one serious defect of epoxy resins is that they are easily combustible. Because of such a defect, it is difficult to use epoxy resins for general-purpose industrial materials such as those mentioned above and for aircraft interior materials. As opposed to them, it is widely known that phenolic resins have excellent flame-retardant characteristics among thermosetting resins. Therefore, even though phenolic resin prepregs are somewhat inferior to epoxy resin prepregs in point of their moldability and mechanical strength, there is increasingly a great demand for phenolic resins.

Two typical methods for producing phenolic resin prepregs. One is a wet method comprising dipping reinforcing fibers in a solution of a matrix resin having a low viscosity; and the other is a hot-melt method in which is used a matrix resin solution having a high viscosity. In the latter hot-melt method, the prepregs formed must specially be releasable from release paper or release film. However, since phenolic resins contain condensed water as generated during their curing, and a solvent for a diluent or a stabilizer, they have a low viscosity and are highly tacky. Therefore, the hot-melt method is hardly applicable to the production of phenolic resin prepregs. For these reasons, at present, the wet method is the mainstream method for producing phenolic resin prepregs. Even in the wet method, however, it is still desired that the phenolic resin prepregs produced have good releasability from rollers, etc.

Various types of composites from prepregs are known. Of those, much used in these days are honeycomb sandwich panels. As being lightweight and highly rigid, honeycomb sandwich panels have many applications for not only aircraft materials but also for sports goods and for construction materials for vehicles, ships, etc. Honeycomb sandwich panels referred to herein are meant to indicate panels which are produced by placing a surface material of a so-called skin panel on both surfaces of a honeycomb core having continuous honeycomb-like pores, followed by heating it under pressure. As the interior material for aircraft, for example, used is a combination of an aramide honeycomb core of so-called Nomex honeycomb and a thermosetting resin prepreg as reinforced with glass fibers, Kevler fibers, carbon fibers or the like.

Even for general-purpose industrial materials and for aircraft interior materials these days, flame-retardant materials of phenolic resin prepregs are being used for honeycomb sandwich panels.

However, where a phenolic resin is used as the matrix resin in those honeycomb sandwich panels, the volatile component peculiar to the phenolic resin will bring about some problems in fabricating the panels. Phenolic resins contain, as a volatile component, condensed water as generated during their fabricating and a solvent for a diluent or a stabilizer. Therefore, where such a phenolic resin is used as the matrix resin in Fabricating honeycomb sandwich panels, he resin prepreg will often peel off from the honeycomb core and the adhesiveness between the prepreg and the core is not often satisfactory. In addition, in that case, the vaporization of the volatile component from the phenolic resin prepreg will lower the surface smoothness of the panels. The wet method of producing phenolic resin prepregs generally comprises a drying step as the most simple and effective means for reducing the amount of the volatile component existing in the phenolic resin, in which reducing the volatile component in the phenolic resin could lower the tackiness of the prepregs formed and improve the releasability thereof. However, merely reducing the amount of the volatile component existing in the phenolic resin in the method will lower the thermal stability of the phenolic resin, whereby the temperature control in the steps constituting the method will be difficult. As a result, it will be difficult to prepare prepregs having stable characteristics and even to produce panels having stable mechanical properties. In addition, since the resin viscosity is increased owing to the reduction in the volatile component, the prepregs produced could not be flexible, or that is, they will no more be drapable. Depending on their applications, honeycomb sandwich panels require complicated shape such as deep drawing or the like. Therefore, one important factor in prepregs for such honeycomb sandwich panels is the drapability to follow the complicated shapes of the panels.

Some techniques for making phenolic resin prepregs have both good releasability and good drapability are known. For example, JP-A-4-306253 and JP-A-5-25363 disclose a method of adding a polyvinyl butyral and a modified silicone oil to phenolic resins; JP-A-3-81340 discloses a method of adding thereto a thermoplastic resin compatible with phenolic resins; and JP-A-4-100851 discloses a method adding thereto a polyacrylamide, an epoxy resin and an inorganic filler. However, the thermoplastic resin used thereon has a relatively low molecular weight, and could hardly satisfy both the releasability and the drapability of prepregs.

On the other hand, for molding honeycomb sandwich panels within a short period of time, it is important that the resins to be used should have good curability. However, resins with high curability are often unstable under heat. The thermal stability of resins is indispensable for good storage of resins and for producing stable resin prepregs, but resins with high curability often have poor thermal stability. Therefore, it is desired to obtain resins having both good curability and good thermal stability, which, however, are contradictory to each other. Specifically, it is desired that resins for prepregs have good thermal stability at temperatures at which they are formed into prepregs, for example, falling between 0 and 70° C., and have good curability at molding temperatures, for example, falling between 130 and 160° C.

For better curability, phenolic resins with high reactivity may be employed, or various curing catalyst may be added to resins. In order to make resins have the contradictory two characteristics noted above, it is considered effective to add curing catalyst with latent potency thereto.

For phenolic resins, it is known that they undergo not only ordinary simple thermal curing reaction but also acid curing reaction for which acid catalysts are generally used. For epoxy resins, acid catalysts with latent potency are available in the market and are used widely. However, many of those acid catalysts for epoxy resins are ionic ones such as onium salts, and, when they are applied to phenolic resins, they will be deactivated by water or polar solvents naturally existing in the resins and will thereby lose their latent potency. In that situation, phenolic resin systems with high latent thermal curability are not known. For these reasons, at present, the applications of phenolic resins are limited. For developing their new applications, phenolic resin systems with high latent thermal curability are desired.

Some examples of applying curing catalysts with latent potency to phenolic resins are known. JP-A-57-102929 discloses a system comprising a sulfonated phenolic resin and a curing agent of phosphoric acid; and JP-A-61-136527 discloses a system comprising a sulfonated phenolic resin and a curing agent of an acidic phosphate ester. However, these systems contain an acid itself, and therefore do not have latent thermal curability, and their stability in a temperature range from ordinary temperature to middle temperatures is poor.

On the other hand, JP-A-55-135661 and JP-A-56-65028 disclose a technique of adding a phosphate ester as the flame retardant to phenolic resins. In this, the additive, phosphate ester could improve the stability of the system under heat, but does not function as a latent acid-generating agent, and therefore, the additive does not participate in curing resins.

One object of the invention is to provide a phenolic resin composition capable of being formed into a prepreg for fiber-reinforced composite materials, of which the releasability and the drapability are both good and of which the moldings have good mechanical strength and good flame retardancy.

Another object of the invention is to provide a prepreg for fiber-reinforced composite materials, of which the releasability and the drapability are both good and of which the panels have good mechanical strength and good flame retardancy.

Still another object of the invention is to provide a woven fabric prepreg, of which the moldings have good surface smoothness and of which the moldability into honeycomb sandwich panels is good enough to produce good structures having high adhesiveness between the skin panel from the prepreg and the honeycomb core.

DISCLOSURE OF THE INVENTION

To attain the above-mentioned objects, the phenolic resin composition for fiber-reinforced composite materials of the invention is characterized by the following constitution. Specifically, the phenolic resin composition comprises at least the following component A and B of a thermoplastic resin:

A: phenolic resin,

B: at least one thermoplastic resin selected from polyvinyl formals, polyvinyl acetals, polyvinyl butyrals, polyvinyl pyrrolidones, polyvinyl acetates, polyvinyl alcohols, polyethylene glycols, copolymerized nylons and dimer acid polyamides.

The phenolic resin composition for fiber-reinforced composite materials of the invention is such that, in its torque-time saturation curve as plotted in curastometry at 130 to 160° C., the saturation time for the torque falls between 3 and 10 minutes and the torque at the saturation time falls between 3 and 30 N·m.

The prepreg of the invention is one as prepared by impregnating the phenolic resin composition for fiber-reinforced composite materials as above that comprises the above-mentioned component A and B of a thermoplastic resin, into reinforcing fibers.

The woven fabric prepreg of the invention, which is to attain the above-mentioned objects, is characterized by the following constitution. Specifically, the woven fabric prepreg comprises, as the indispensable constituent, carbon fibers and a phenolic resin, of which the volatile content falls between 0.5 and 7.5% by weight and of which the cover factor is at least 93%.

The method for preparing the prepreg for fiber-reinforced composite materials of the invention comprises filmwise applying the phenolic resin composition to reinforcing fibers followed by heating the resulting film under pressure to thereby impregnate it into the reinforcing fibers.

BEST MODES OF CARRYING OUT THE INVENTION

The reinforcing fibers for use in the invention include, for example, glass fibers, carbon fibers, aramide fibers, boron fibers, alumina fibers, silicon carbide fibers and natural fibers. Two or more different types of those fibers may be combined in mixtures.

The configuration and the arrangement of the reinforcing fibers are not specifically defined. For example, any of long fibers, short fibers, continuous fibers and others are employable herein. For ensuring high strength, however, preferred are continuous fibers. Regarding the configuration of the reinforcing fibers, for example, herein employable are any of sheets such as woven fabrics, non-woven fabrics, mats, knits and others of them, as well as tapes such as braids, unidirectional strands, rovings and others of them.

Of those reinforcing fibers, preferred are carbon fibers for the purpose of obtaining more lightweight and more durable panels. Carbon fibers have high heat resistance and high tensile strength, and are generally used as high-performance reinforcing fibers. Depending on their applications, various types of carbon fibers are employable herein. Of such carbon fibers, especially preferred are high-strength, high-elongation carbon fibers having a tensile strength of at least 4.4 GPa and a tensile elongation of at least 1.6%, and more preferred are high-strength, high-elongation carbon fibers having a tensile strength of at least 4.7 GPa and a tensile elongation of at least 1.9%.

It is desirable that the cross-sectional profile of the reinforcing fibers for use in the invention is substantially circular. This is because the re-configuration of filaments of reinforcing fibers having a circular cross-sectional profile is easy when resins are impregnated into the fibers, thereby facilitating the resin impregnation into the fibers. In addition, the thickness of the reinforcing fiber bundles could be reduced, which produces the advantage of readily giving prepregs with better drapability. Moreover, it has been found that the adhesion strength of the prepregs to honeycomb cores is increased and the flexural strength of the resulting honeycomb sandwich panels is thereby increased.

The substantially circular cross-sectional profile as referred to herein for reinforcing fibers is meant to indicate that the degree of profile modification of the fibers, which is defined by the ratio of the radius, R, of the circumscribed circle of the cross section of each fiber to the radius, r, of the inscribed circle thereof, R/r, is at most 1.1. Reinforcing fibers having a degree of profile modification of larger than 1.1 will be disadvantageous, since the reinforcing fiber bundles that constitute fabric textures will be bulky, thereby often promoting the behavior to receive too much resin when they are formed into resin-impregnated prepregs. In addition, where the reinforcing fibers for resin impregnation therein to are in the form of fabrics, the reinforcing fiber bundles constituting the fabrics could hardly spread to a sufficient degree, and, as a result, the area of the yarn-to-yarn voids in the fabrics will be large. In that case, where a resin is infiltrated into the fabrics to prepare resin-impregnated prepregs, the area of the voids filled with resin only (hereinafter referred to as "void area") in the prepregs will be large. As a result, the surface smoothness of the moldings of the prepregs will be poor.

Where the reinforcing fibers for use in the invention are continuous fibers, they may be used in the form of fiber bundles composed of a plurality of filaments, or that is, they may be in the form of reinforcing fiber bundles (hereinafter referred to as "reinforcing fiber bundles"). The number of filaments that constitute one reinforcing fiber bundle preferably falls between 6000 and 30000, more preferably between 6000 and 18000. The advantage of the reinforcing fiber bundles, in which the number of filaments constituting one bundle falls within the preferred range, is that, when the bundles are in the form of a woven fabric as one example, the number of the crossing points of the warp and the weft in the fabric could be fully reduced, and, in addition, the fabric texture could be well thinned. As a result, the prepregs to be prepared by impregnating resins into the fabrics could readily have good drapability. However, reinforcing fiber bundles in which the number of filaments constituting one bundle is smaller than 6000 will be disadvantageous in that the number of the reinforcing fiber bundles to constitute a unit area having a predetermined unit weight shall be large. In that case, when the reinforcing fiber bundles are uses in the form of fabrics as one example, the fabrics will be much crimped to a greater degree. The degree of crimping of fabrics depends on the degree of folding in the folded part of the reinforcing fiber bundles constituting the fabrics. With the reinforcing fiber bundles constituting fabrics being folded to a greater degree, the fabrics shall be much crimped also to a greater degree, whereby their surface smoothness will be lowered. On the other hand, reinforcing fiber bundles in which the number of filaments constituting one bundle is larger than 30000 will be also disadvantageous in that, when they are woven into fabric, the number of the reinforcing fiber bundles constituting the fabric shall be reduced and the void area of the fabric will be thereby increased. In addition, since its self-sustaining ability will be low, the fabric will be difficult to handle. Moreover, since the reinforcing fiber bundles will be thick, resins could hardly penetrate therein to when the bundles are formed into prepregs or when the prepregs are fabricated.

The reinforcing fiber fabrics for use in the invention may be in any form of known two-dimensional fabrics. Preferred examples of the fabric textures include plain fabrics, twill fabrics, leno fabrics, satin fabrics, etc. Of those, preferred are plain fabrics, as being readily formed into thin moldings. In addition, as having good drapability, they can be easily worked into complicated structures, for example, through deep drawing or the like.

The phenolic resins for use in the invention are reaction products to be obtained through condensation of phenols and formaldehyde. They may be either resol-type phenolic resins or novolak-type phenolic resins. These two types may be combined, if desired. However, preferred are aqueous resol-type phenolic resins, in view of their curability under heat even in the absence of a curing agent and of their good workability and good working environments.

The thermoplastic resin for use in the invention is at least one selected from polyvinyl formals, polyvinyl acetals, polyvinyl butyrals, polyvinyl pyrrolidones, polyvinyl acetates, polyvinyl alcohols, polyethylene glycols, copolymerized nylons and dimer acid polyamides. These thermoplastic resins are characterized by their good compatibility or dispersibility with phenolic resins.

The thermoplastic resins for use in the invention may have a weight-average molecular weight falling between 300,000 and 3,000,000, but preferably between 500,000 and 2,000,000. The resins of which the weight-average molecular weight falls within the defined range are preferred, as films and prepregs comprising them could have good releasability from release paper and release film. The releasability of the films and prepregs is essentially derived from the rubber-like elasticity and the improved aggregating ability of the resin composition that comprises the high-molecular thermoplastic resin. Therefore, as compared with the method of enhancing the reactivity of phenolic resins themselves or of reducing the amount of the volatile component in the resin composition so as to increase the viscosity of the resin composition, thereby increasing the releasability of the resin films or the resin-impregnated prepregs, the method of adding such a high-molecular thermoplastic resin to the resin composition is advantageous in that the viscosity of the resin composition is kept low and therefore the resin-impregnated prepregs could have good drapability.

In addition, it has been found that the honeycomb sandwich panels as produced by the use of the prepregs are much improved beyond expectations with respect to their mechanical strength including adhesion strength, flexural strength, etc.

As opposed to these, thermoplastic resins having a weight-average molecular weight of smaller than 300,000 are unfavorable, since their elasticity-imparting effect is poor so that the releasability of the prepregs comprising them is not good. Even if their amount in the resin composition is increased in order to improve the prepregs' releasability, the drapability of the prepregs will be worsened. In addition, in general, since thermoplastic resins are easily combustible by themselves, they will interfere with the flame retardancy intrinsic to phenolic resins. On the other hand, thermoplastic resins having a weight-average molecular weight of larger than 3,000,000 are also unfavorable, since they are difficult to dissolve in phenolic resins. Even if they could be dissolved in phenolic resins, the viscosity of the resulting resin composition will inevitably increase, and the lowermost viscosity thereof will be extremely high. As a result, the resin composition could hardly penetrate into reinforcing fibers, and, after all, the quality of the prepregs of the resin-impregnated fibers will be bad. In addition, while the prepregs are fabricated, the fluidity of the resin therein is poor, and, as a result, the adhesive strength of the panels obtained will be poor.

It is desirable that the thermoplastic resins for use in the invention are soluble in phenolic resins. The wording "soluble" as referred to herein is meant to indicate that, when an additive is added to a mother liquid, its original form could no more admitted therein when seen visually or when touched, and the resulting solution is uniform. For dissolving the thermoplastic resins in phenolic resins, employable are any methods including, for example, a method of mixing them under heat at suitable temperatures, a method of previously dissolving a thermoplastic resin in a suitable solvent followed by adding the resulting solution to phenolic resins.

It is desirable that the amount of the thermoplastic resin to be added to the phenolic resin falls between 0.1 and 10 parts by weight relative to 100 parts by weight of the nonvolatile component in the phenolic resin. Adding a smaller amount of the thermoplastic resin than 0.1 parts by weight is unfavorable, since the effect of the thermoplastic resin added to make the prepregs elastic and to improve the aggregation of the resin composition is unsatisfactory. On the other hand, adding a larger amount of the thermoplastic resin than 10 parts by weight is also unfavorable, since the thermoplastic resin added could hardly dissolve in the phenolic resin and, in addition, the drapability and the flame retardancy of the prepregs will be poor.

Adding an acid-generating agent to the resin composition of the invention is desirable. The acid-generating agent as referred to herein is defined as a substance which is not acidic by itself but capable of making a resin system acidic under heat during molding. It includes any of BrØnsted acids and Lewis acids. The acid-generating mechanism in the agent may be any of chemical reaction or physical change. It is desirable that the acid-generating agent for use in the invention is relatively stable in water and polar solvents, that its latent potency is high and that its curability is good. For example, employable herein are acid esters, acid anhydrides, salts, etc. Especially preferred are alkyl p-toluenesulfonates, as well satisfying the requirements noted above. More preferred is ethyl p-toluenesulfonate (this is hereinafter referred to as ethyl tosylate).

Adding such an acid-generating agent, especially that with high latent potency to the resin composition of the invention makes it possible to improve the viscosity stability of the composition while the composition is stored or when it is formed into prepregs and to improve the curability of the composition being fabricated. The effect of the agent may be easily determined through curastometry. The curastometry may be attained by the use of a curastometer, which is a tester to determine the vulcanizability of rubber compounds or to determine the curing process of thermosetting resins. Using the tester, curastometer, a sine-wave vibration having a predetermined amplitude is imparted to a test piece at a predetermined temperature under a predetermined pressure, and the time-dependent variation in the viscoelastic stress (torque) to the test piece that depends on the curing degree of the test piece is measured. The measurement is effected in a closed high-pressure system, in which the solvent and other volatile ingredient do not vaporize. Therefore, curastometry is suitable to the curing profile analysis of phenolic resins, and is therefore employed frequently in the art.

The curastometry is herein effected essentially in accordance with JIS K6300 for "Die Vulcanization Test Method A". For the curastometry, used herein is Horiba Seisakusho's Curastometer V Model. The frequency is 100 cpm, the angle of amplitude is ±¼°, and the die form is of P-200.

The torque-time curve in the curastometry is one as plotted in a graph in which the vertical axis indicates the torque to the resin tested and the horizontal axis indicate the test time. In general, the torque increases with the resin curing reaction advancing, and is saturated nearly at the end of the curing reaction.

In the torque-time curve, the saturation time and the rise time indicate the time for which the inclination of the curve is $\frac{1}{30}$ of the maximum inclination thereof after the inclination of the curve has reached the maximum value, and the time for which the inclination of the curve is $\frac{1}{30}$ of the maximum inclination thereof before the inclination of the curve has reached the maximum value, respectively.

The curastometric profile is closely related to the fabrication time. In the case of fabricating honeycomb sandwich panels which may depend on the volatile content of the resin composition used in some degree, for example, when the torque to the resin has reached a certain degree over a certain period of time, the resin prepreg could be well fabricated with being peeled little from the core after that period of time.

The phenolic resin composition of the invention shall be such that, in its curastometric torque-time curve, the torque saturation time falls between 3 and 10 minutes and the torque at the saturation time falls between 3 and 30 N·m. If the torque saturation time is shorter than 3 minutes, the resin composition could not have satisfactory fluidity and will be difficult to fabricate. If the time is longer than 10 minutes, the resin composition could not cure to a satisfactory degree and the cured resin will often peel off from the core in the resulting panels and, in addition, the physical properties of the panels will unfavorably fluctuate. On the other hand, if the torque at that saturation time is smaller than 3 N·m, the resin composition will be still soft at the cure temperature and the cured resin will often peel off from the core in the resulting panels. If the torque is larger chain 30 N·m, the toughness of the moldings produced will be low.

It is desirable that the phenolic resin composition of the invention is such that, in its curastometric torque-time curve, the torque rise time falls between ⅕ and ⅘ of the saturation time and the torque at the rise time falls between 0 and 1 N·m. If the torque rise time is shorter than ⅕ of the saturation time, the resin flow could not have a satisfactory period of time for its good fluidity; but if longer than ⅘ thereof, the resin composition will cure too rapidly whereby the quality and the physical properties of the resulting panels will be worsened. On the other hand, if the torque at the rise time is larger than 1 N·m, such is also unfavorable since the resin flow could not have a satisfactory period of time for its good fluidity.

It is also desirable that the phenolic resin composition of the invention has a pH value falling between 4 and 7. The pH of the composition may be measured with any ordinary pH meter. If its viscosity is too high to measure the pH value of the resin composition, the resin composition may be softened under heat prior to the measurement of its pH value. The resin composition of which the pH value oversteps the preferred range will be unfavorable, as being unstable.

It is still desirable that the viscosity change in the phenolic resin composition of the invention at 70° C. for 2hours is at most 3 times, but preferably at most 2 times. The viscosity of the resin composition may be measured with any ordinary viscometer. Briefly, for the measurement of the viscosity change, used is a 0.04-rad corn plate having a diameter of 25 mm and its revolution is 5 rpm. It is further desirable that the pH change in the resin composition at 70° C. after 2 hours falls between 0 and 2, more preferably between 0 and 1. If the viscosity change and the pH change in the resin composition overstep the preferred ranges, the quality of the prepregs of the composition will often fluctuate.

It is also desirable that the pH change in the phenolic resin composition of the invention at 120° C. after 6 minutes is at least 3, but preferably at least 4. If the pH change in the resin composition oversteps the preferred range, the composition, when fabricated, could not cure to a satisfactory degree, and intended panels could not be obtained.

It is desirable to add fine inorganic grains to the resin composition of the invention. Regarding the fine inorganic grains, it is desirable that their size is not larger than 20 μm, preferably not larger than 5 μm, more preferably between 0.001 μm and 1 μm, so that they could uniformly penetrate into reinforcing fiber bundles. Adding such fine inorganic grains to the resin composition is preferred, since they act as a filler for improving the flame retardancy of the moldings of the composition and since they promote the viscosity increase in the matrix resin, the tackiness reduction in the prepregs of the composition and the improvement in the releasability of the moldings of the composition.

Regarding the type of the fine inorganic grains usable in the invention, preferred are magnesium oxide, magnesium hydroxide, calcium oxide, calcium hydroxide and the like, but are not specifically defined. Any fine inorganic grains capable of being added to ordinary thermosetting resin compositions are employable herein with no specific limitation. Apart from those mentioned above, any others, for example, kaolin, talc, silica, clay, mica, bentonite, wollastonite, zeolite, cement, aluminium oxide, aluminium hydroxide, magnesium carbonate, calcium carbonate, aluminium carbonate, calcium chloride, potassium titanate, carbon black and the like are also favorably used herein.

Optionally, any other components, such as fillers, flame retardants, colorants, dyes, reaction retardants and the like, may be added to the phenolic resin or use in the invention.

It is desirable that the volatile content of the prepregs for fiber-reinforced composite materials of the invention is controlled to fall between 0.5 and 7.5% by weight, preferably between 2.5 and 7% by weight, more preferably between 3 and 7% by weight. Specifically, if the volatile content is larger than 7.5% by weight, the volatile component will vaporize too much while the prepregs are fabricated, whereby the surface of the resulting panels will be roughened due to the vaporization of the volatile component. As a result, the surface smoothness of the panels will be lowered. If so, in addition, when the prepregs are fabricated into honeycomb sandwich panels, the inner pressure in the honeycomb core will increase whereby the adhesion strength between the honeycomb core and the skin panel in the resulting panels will be lowered. Moreover, if the volatile content is too large overstepping the preferred range, the tackiness of the surface of the prepregs will increase. If so, when the prepregs are fabricated into complicated panels, the surface of the resulting panels will be much wrinkled. On the other and, if the volatile content is smaller than 0.5% by weight, the thermal stability of the phenolic resin in the prepregs will be low so that the temperature control in the process of working the prepregs will be difficult. As a result, it will be difficult to stabilize the properties of the prepregs being worked and to stabilize the physical properties of the panels to be obtained. If so, in addition, the viscosity of the resin composition will be high. When the resin composition having such high viscosity is formed into woven fabric prepregs, the flexibility of the prepregs will be poor, and the prepregs will be difficult to handle.

It is desirable that the water content of the volatile component is at least 50% more preferably at least 60%. If the water content of the volatile component is smaller than 50%, and if the amount of the other solvent except water is increased in the resin composition, the solvent will readily vaporize during the process of processing the composition. If so, it will be difficult to control the intended volatile content of the resin composition, and even the tackiness and the drapability of the prepregs of the composition. Moreover, time-dependent change in the volatile content of the prepregs will be inevitable, and the adhesion strength of the prepregs could not be stabilized. Furthermore, still another problem is that the amount of the organic solvent that vaporizer in the step of preparing the resin composition, in the step of forming the prepregs and even in the step of fabricating the prepregs into panels will increase, thereby worsening the working environments.

It is desirable that the gelling time for the prepregs for fiber-reinforced composite materials of the invention, at 160° C., falls between 20 and 150 seconds, more preferably between 30 and 90 seconds. If the gelling time is shorter than 20 seconds, the reactivity of the phenolic resin for condensation is high within such a short period of gelling time, or that is, the phenolic resin is still curing within that time thereby often lowering the fluidity of the matrix resin. As a result, the prepregs formed will be often difficult to handle, and, in addition, since the operator who is molding the prepregs into honeycomb sandwich panels could not have a satisfactory period of time for degassing to remove the volatile component from the prepregs, fabricating the prepregs into honeycomb sandwich panels with good adhesion strength will be difficult. Moreover, since the skin panel from the prepreg could not well adhere to the honeycomb, it will be often impossible to construct honeycomb sandwich panels. On the other hand, if the gelling time is longer than 150 seconds, one will take a lot of time for curing the prepregs and for fabricating them. In that condition, if curing the prepregs is intended to be completed within a predetermined period of time, the reactivity of the prepregs within that period of time will be insufficient so that the adhesion strength of the cured prepregs to honeycomb cores will be lowered.

It is desirable that the prepreg for fiber-reinforced composite materials of the invention has a resin flow at 160° C. of from 5 to 35%, but preferably from 10 to 20%. If the resin flow of the prepreg is smaller than 5%, the fluidity of the prepreg being fabricated will be poor. When the prepreg with such poor fluidity is fabricated into honeycomb sandwich panels, then satisfactory fillets could not be formed therein, and the resulting panels will have poor adhesion strength. On the other hand, if the resin flow of the prepreg is larger than 35%, much resin will flow out of the prepreg being fabricated. If so, the resulting panels could not have a predetermined resin content.

The woven fabric prepreg of the invention comprises, as the indispensable constituent elements, carbon fibers and a phenolic resin, and its cover factor must be at least 93%, but preferably at least 97%. The cover factor as referred to herein indicates the area of fibers only in the woven fabric prepreg, exclusive of the yarn-to-yarn void area therein, and it may be represented by the following formula:

$$\text{Cover Factor} = [(S1-S2)/S1] \times 100 \quad (\%)$$

wherein S1 means a predetermined surface area of the woven fabric prepreg, and S2 means the void area in the area of S1.

Where the void area in the woven fabric prepreg is difficult to measure, the prepreg is exposed to light at its back surface. In that condition, the area of carbon fibers only in the prepreg could be clearly differentiated from the area having no reinforcing carbon fibers therein and filled with resin only. If the prepreg has a cover factor of smaller than 93% and when it is molded, no reinforcing carbon fibers will exist in some parts of the surface of the resulting panels, and the panels will thereby have poor surface smoothness. As the case, the volatile component will vaporize away from the void area filled with resin while the prepreg is fabricated into panels, and surface of the resulting panels will be roughened in the void area. As a result, the surface smoothness of the panels is lowered, and, in addition, the disposition of the carbon fiber bundles in the panels will be disordered so that the surface quality of the panels will be much lowered.

It is also desirable that the woven fabric prepreg has a lowermost viscosity of at most 50,000 poises. If its lowermost viscosity is higher than 50,000 poises, fabricating the prepreg into complicated panels will face some difficulties. For example, when the prepreg is fabricated into honeycomb sandwich panels, the skin panel from it will peel off from the honeycomb core. As the case may be, the surface of the panels will be wrinkled.

For producing the prepreg of the invention, suitably employed is any of a wet method that comprises dipping reinforcing fibers in a solution of a matrix resin having a low viscosity or a hot-melt method in which is used a matrix resin solution having a high viscosity. In order to reduce its tackiness, the prepreg having been produced according to the method of impregnating a phenolic resin composition into reinforcing fibers may be heated at a predetermined temperature.

For the heat treatment to be effected at a predetermined temperature, for example, the intermediate prepreg having been prepared by impregnating a phenolic resin composition into reinforcing fibers in the manner noted above may be kept heated in such a manner that the difference between the surface temperature of the intermediate prepreg and the solid temperature thereof is controlled to be at most 5° C. The temperature for the heat treatment may be ordinary temperature, but preferably falls between 25 and 60° C., more preferably between 30 and 50°. If the temperature is lower than 25° C., much time will be taken before the intermediate prepreg could reach a predetermined surface condition, and, in addition, the temperature of the entire intermediate prepreg could hardly be uniform, or that is, the intermediate prepreg will be heated unevenly. As a result, homogeneous prepregs could not be obtained. On the other hand, if the temperature for the heat treatment is higher than 60° C., the reaction control for the phenolic resin in the prepreg will be difficult. If so, the prepreg formed will be poorly flexible, and its handlability will be bad.

In the heat treatment for the intermediate prepreg, it is desirable that the difference between the surface temperature of the prepreg and the solid temperature thereof is almost 5° C., more preferably at most 3° C. It the temperature difference is larger than 5° C., the surface condition of the prepreg being heat-treated could not be equal to the solid condition thereof, and, as a result, the prepreg thus heat-treated could not be homogeneous. The surface temperature as referred to herein indicates the temperature of the outermost layer of the intermediate prepreg; while the solid temperature indicates the temperature of the center part thereof. For example, for sheet prepregs as piled up for heat treatment, the solid temperature is the temperature at the center part of the pile of them.

The time for the heat treatment preferably falls between 12 hours and 30 days, more preferably between 24 hours and 20 days. If the time is shorter than 12 hours, the entire intermediate prepreg could not reach a predetermined temperature within such a short period of time, and its temperature could not be constant. Specifically, in that condition, the difference between the surface temperature of the intermediate prepreg and the solid temperature thereof will be larger than 5° C., and the prepreg will be healed unevenly. On the other hand, if the time for the heat treatment is longer than 30 days, the intermediate prepreg will be heated too much, and, as a result, it will become poorly flexible and its workability will be worsened.

The intermediate prepreg to be subjected to heat treatment in the invention may be in any desired form of, for example, tapes, sheets, rolls and others, and its shape is not specifically defined. For example, when a long-size intermediate prepreg is heat-treated, it is preferably in the form of a roll. During the heat treatment, it is desirable that the intermediate prepreg is kept in an air-tightly sealed container or bag. This is because, in an open system in which the surface of the intermediate prepreg will be directly heated, the volatile component existing in the intermediate prepreg will vaporize too rapidly while the prepreg is heated, and the temperature control for the prepreg in that condition is difficult. In particular, for intermediate prepreg rolls, if they are heat-treated in such an open system, the difference between the surface temperature of the roll and the solid temperature thereof will be large owing to the thickness of the roll so that the prepreg rolls will be unevenly heated. The inner pressure in the air-tightly sealed container or bag in which the intermediate prepregs are heat-treated may be any of increased pressure, atmospheric pressure or reduced pressure. However, the heat treatment is preferably effected under atmospheric pressure. Also preferably, the inside of the air-tightly sealed container is purged with air or nitrogen, more preferably with nitrogen.

The honeycomb cores for use in the invention may be any known ones made of, for example, aluminium, paper, aramide resins, glass, fiber-reinforced plastics or the like, but preferred are those made of aramide fibers, which are so-called Nomex honeycomb cores.

EXAMPLES

The invention is described in more detail with reference to the following Examples, in which the physical properties of the samples are measured according to the methods mentioned below.

A. Curability of Resins:

Used is a curastometer, Model V from Horiba Seisakusho. The frequency is 100 cpm, the angle of amplitude is ±¼°, the die form is of P-200, and the temperature for the measurement is 140° C. Based on the torque saturation time, the torque rise time, the saturation torque and the rise torque as measured through the curastometry, the curability of resins is evaluated.

B. pH of Resins:

Used is a compact pH meter, Twin pH B-212 from Horiba Seisakusho. Prior to the test, made is two-point calibration using standard buffer solutions with pH 4 and 7. When the resin viscosity is too high and the measurement is difficult, the sample is heated to soften it. The pH of each resin sample is read at room temperature.

C. Viscosity Change in Resins:

Used is a viscoelastometer, ARES from Reometric Scientific Inc., which is equipped with a 0.04-rad corn plate having a diameter of 25 mm. The revolution of the corn plate is 5 rpm. The time-dependent viscosity change in resins is measured at 70° C. for 2 hours. The viscosity change is represented by the viscosity increase in 2 hours relative to the original viscosity.

D. Volatile Content (Vc):

A prepreg sample to be tested is cut into pieces of 4×4 inches, which are heated in an oven at 160° C. for 10 minutes. From the weight change before and after the heat treatment, the volatile content of the prepreg sample is obtained.

E. Cover Factor:

The cover factor of each woven fabric prepreg prepared herein is obtained through imaging. Briefly, using an imaging device which is so set that the fiber area in the woven fabric prepreg being processed therein could be differentiated from the void area filled with resin therein, the cover factor of the prepreg is calculated according to the following formula in which S1 indicates the entire surface area of the woven fabric prepreg and S2 indicates the void area in the prepreg.

$$\text{Cover Factor} = [(S1 - S2)/S1] \times 100 \quad (\%)$$

F. Gelling Time:

A test sample having a size of 0.25×0.25 inches is cut out of a prepreg to be tested, and heated on a hot plate at 160° C., whereupon the time in which the sample no more shows cobwebbing is measured. The time measured indicates the gelling time for the sample.

G. Resin Flow:

Test samples each having a size of 4×4 inches are cut out of a prepreg to have a constitution of (45°/45°), and 6 test samples are laminated. One FEP film, three glass clothes and one perforated FEP film are put on the both surfaces of the prepreg laminate in such a manner that the perforated FEP film faces directly the surface of the prepreg laminate. Using a hot pressing machine, this is heated at 160° C. for 5 minutes under a pressure of 100 psi. The weight change in the prepreg laminate before and after the pressing is obtained, which indicates the resin flow in the prepreg.

H. Water Content of Volatile Component:

Using a thermal analyzer, TGA-50 from Shimadzu Seisakusho, a prepreg to be tested is heated from 25° C. up to 300° C. at a heating rate of 5° C./min, whereupon the gag generated is analyzed through gas chromatography. The water content of the entire volatile component in the prepreg is calculated from the data thus obtained.

I. Resin Content:

A sample having a size of 4×4 inches is cut out of a prepreg to be tested, and its weight, W1 is measured. This is ultrasonically washed in N-methyl-2-pyrrolidone, methyl ethyl ketone and methylene chloride for 5 minutes each so that the resin is dissolved out in them. The remaining fiber bundles are dried at 120° C. for 30 minutes, and their weight, W2 is measured. The resin content of the prepreg is represented by the following formula:

$$[W1(1-Vc) - W2]/[W1(1-Vc)] \times 100 \quad (\%)$$

J. Fabrication of Honeycomb Sandwich Panels:

A predetermined number of prepregs each having a predetermined constitution are laminated, to which is attached a Nomex honeycomb (SAH1/8-3.0 from Showa Aircraft). An PEP film is put on the both surfaces of this, then sandwiched between a stainless steel plates, and fabricated under heat and pressure. For the hot press fabrication, the heating temperature is 138° C., the time is 10 minutes and the pressure is 17 kg/cm². During the process, the pressure is once released at the gelling time at 138° C. for the prepreg minus 10 to 15 seconds so as to remove the volatile gas, and thereafter the heating under pressure is continued.

K. Climbing Drum Peel Strength (hereinafter referred to as CDP):

One-ply woven fabric prepreg with a constitution of (0°/90°) is attached to the both surfaces of a Nomex honeycomb core in such a manner that the warp direction of the prepreg is perpendicular to the ribbon direction of the honeycomb core. This is fabricated under the same condition as in J noted above, and a test piece having a size of 3 inches×12 inches is cut out of the panel in which the 12-inch direction is perpendicular to the ribbon direction of the honeycomb core. CDP of the test piece is measured according to ASTM D1781.

L. Long Beam Flexural Strength (hereinafter referrer to as LBF):

Two-ply woven fabric prepreg with a constitution of (0°/90°) is attached to the both surfaces of a Nomex honeycomb core in such a manner that the warp direction of the prepreg is perpendicular to the ribbon direction of the honeycomb core. This is fabricated under the same condition as in J noted above, and a test piece having a size of 3 inches×24 inches is cut out of the panel in which the 24-inch direction is perpendicular to the ribbon direction of the honeycomb core. LBF of the test piece is measured according to MIL-STD-401.

M. Surface Smoothness:

One-ply woven fabric prepreg with a constitution of (0°/90°) is attached to the both surfaces of a Nomex honeycomb core in such a manner that the warp direction of the prepreg is perpendicular to the ribbon direction of the honeycomb core. This is fabricated under the same condition as in J noted above. The surface roughness of the both surfaces of the thus-prepared panel is measured, using a surface roughness meter, Surftest 301 from Mitsutoyo. Briefly, a probe is run on each surface for a length of 2.5 mm, and a difference between the mean height of five highest points in that length and the mean height of five lowest points therein is obtained. The same test is repeated for a total of 5 times for one test piece, and a mean value of the data obtained indicates the surface smoothness of the prepreg.

N. Releasability:

Using a bar coater, a sample of a resin composition to be tested is applied onto the heavy release surface of a release paper (WBE90R-DT from Lintec) to form thereon a resin film having a predetermined unit weight of 80±5 g/cm². Another release paper of the same type is attached to the resin film with its light release surface facing the resin film, and is peeled off, whereupon the easiness in peeling is determined in five grades. Grade 1 is for the samples fin which the resin film partly adhered to the light release surface of the release paper; Grade 3 is for those in which the resin film was hardly peeled but no film adhered to the light release surface of the release paper; and Grade 5 is for those in which the resin film was readily peeled. Grade 2 is between Grade 1 and Grade 3; and Grade 4 is between Grade 3 and Grade 5.

O. Flexural Modulus:

A sample having a size of 15×85 mm is cut out of a prepreg to be tested, and is measured for its flexural modulus according to the JIS standard for "Flexural Strength Test for Fiber-Reinforced Plastics", using a universal material tester, Instron 4201 Model from Instron Japan. Briefly, in the test, the diameter of the indenter used is 4 mmΦ, the cross head speed is 1 mm/min, and the span distance is 40 mm. The measurement is conducted at 25° C. and 50% RH. The data in this test mean that samples having a higher flexural modulus have lower drapability.

P. Self-Extinguishing Time:

A plurality of woven fabric prepregs each having a constitution of (0°/90°) are laminated up to a predetermined thickness, and fabricated under heat and pressure in an autoclave into a test plate having a length of 127 mm, a width of 12.7 mm and a thickness of 0.8 mm. According to the standard of BMS8-274 and JIS K6911B, the self-extinguishing time for the test plate is measured. The data in this test means that samples for which the self-extinguishing time is shorter have better flame retardancy. In BMS8-274, the self-extinguishing time must be not longer than 10 seconds for practicable flame retardancy.

In Examples mentioned below, used were the following carbon fiber fabrics:

Fabric A: T700S-12K-50C (from Toray)
  Number of filaments per one carbon Fiber bundle: 1200
  Tensile strength: 4.9 GPa
  Tensile elongation: 2.1%
  Degree of profile modification of the fibers: 1.05
  Constitution: plain fabric
  Unit weight: 193 g/m$^2$
Fabric B: T300B-3K-50C (from Toray)
  Number of filaments per one carbon fiber bundle: 3000
  Tensile strength: 3.5 GPa
  Tensile elongation: 1.5%
  Degree of profile modification of the fibers: 1.15
  Constitution: plain fabric
  Unit weight: 193 g/m$^2$.

In those Examples, used were the following thermoplastic resins:

Polyvinyl Pyrrolidone:
  Luviskol K-90 (from BASF Japan)
  Weight-average molecular weight: 1,200,000
Polyvinyl Pyrrolidone (low-molecular product):
  Luviskol K-30 (from BASF Japan)
  Weight-average molecular weight: 45,000
Polyethylene Glycol:
  Polyethylene Glycol 2,000,000 (from Wako Pure Chemical Industry)
  Weight-average molecular weight: 1,500,000 to 2,000,000
Polyvinyl Butyral:
  Weight-average molecular weight: 500,000

Examples 1 to 5

In a phenolic resin (Phenolite 1196 from Dai-Nippon Ink and Chemicals, having a nonvolatile content of 83%) to be a base component, dispersed was a predetermined amount, relative to 100 parts by weight of the nonvolatile content of the phenolic resin, of a thermoplastic resin, at a temperature not higher than 30° C., and then kneaded under heat. The resulting mixture was cooled to be at a temperature not higher than 45° C., to which were added a predetermined amount of fine inorganic grains, and further kneaded to prepare a matrix resin. This was coated on a release paper to form a resin film. The resin film was attached to the both surfaces of a woven fabric of carbon fibers, and pressed under heat to prepare an intermediate prepreg. The resin content of the intermediate prepreg was so controlled that the skin part from the prepreg in the honeycomb panel to be constructed herein could have a resin content of 41%. The intermediate prepregs were heated in an oven at 40° C. for 3 days to be woven fabric prepregs. These woven fabric prepregs completely had good releasability and good drapability. Using the prepregs produced herein, honeycomb sandwich panels and cured laminate plates were formed through press fabrication and autoclaving treatment. These were tested for CDP, LBF and the self-extinguishing time. The test data are shown in Table 1, along with the resin compositions prepared and used herein.

TABLE 1

|  |  | Example | | | | | |
| --- | --- | --- | --- | --- | --- | --- | --- |
|  |  | 1 | 2 | 3 | 4 | 5 | 6 |
| Carbon Fiber Fabric |  | A | A | B | A | A | A |
| Phenolic Resin | Phenolite 1196 | 100 | 100 | 100 | 100 | 100 | 100 |
| Thermoplastic Resin | Polyvinyl Pyrrolidone | 5 | 3 | 3 | 0 | 0 | 3 |
|  | Polyethylene Glycol | 0 | 0 | 0 | 3 | 0 | 0 |
|  | Polyvinyl Butyral | 0 | 0 | 0 | 5 | 0 | 0 |
| Fine Inorganic Grains | Caicium Carbonate | 0 | 4 | 4 | 4 | 4 | 4 |
|  | Magnesium Oxide | 0 | 0.2 | 0.2 | 0.2 | 0.2 | 0.2 |
| Cover Factor (%) |  | 94 | 97 | 93 | 96 | 95 | 99 |
| Releasability (Grade) |  | 4 | 5 | 4 | 5 | 4 | 5 |
| Flexural Modulus (kgf/mm) |  | 116 | 90 | 134 | 75 | 125 | 70 |
| CDP (in-lb/3 in) |  | 5.5 | 7.0 | 5.7 | 6.3 | 6.4 | 7.8 |
| LBF (ksi) |  | 66 | 55 | 61 | 69 | 68 | 50 |
| Surface Smoothness ($\mu$m) |  | 54 | 42 | 58 | 63 | 66 | 36 |
| Self-extinguishing Time (sec) |  | 9 | 4 | 5 | 5 | 8 | 4 |

As is obvious from Table 1, the sample of example 2, in which the amount of the thermoplastic resin was reduced and which contained fine inorganic grains, is better than that of Example 1 which did not contain fine inorganic grains, with respect to the releasability and the drapability. The sample of Example 3, in which the cross-sectional profile of the carbon fibers was not circular and the number of filaments constituting one carbon fiber bundle was small, is worse than that of Example 2 with respect to the drapability, CDP and LBF. The samples of Examples 4 and 5 in which polyethylene glycol or polyvinyl butyral was used as the thermoplastic resin both have good properties. The sample of Example 6 in which the woven fabric prepreg had a higher cover factor is better than that of Example 2 with respect to CDP.

Comparative Example 1

The same process as in Example 2 was tried to prepare a woven fabric prepreg, except that no thermoplastic resin was added to the resin composition herein. However, an intermediate prepreg could not be obtained herein since its releasability was extremely bad.

Comparative Example 2

The same process as in Comparative Example 1 was repeated to prepare a woven fabric, except that the amount of magnesium oxide added was increased to 4 parts by weight. The intermediate prepreg prepared herein had good releasability. However, the drapability of the woven fabric prepreg prepared herein was not good. When the prepreg was fabricated into complicated panels, the panels were much wrinkled.

Comparative Example 3

The same process as in Example 2 was tried to prepare a woven fabric prepreg, except that the low-molecular product of polyvinyl pyrrolidone was used herein. However, an intermediate prepreg could not be obtained herein since its reeleasability was extremely bad.

Comparative Example 4

The same process as in Comparative Example 3 was repeated to prepare a woven fabric, except that the amount of the low-molecular product of polyvinyl pyrrolidone added was increased to 10 parts by weight so as to improve the releasability of the intermediate prepreg. The prepreg prepared herein could be released from the release paper with difficulty. The self-extinguishability of the panel from the prepreg was poor.

Comparative Example 5

A woven fabric prepreg was prepared in the same manner as in Comparative Example 4, except that the carbon fiber fabric B was used herein. This was extremely bad with respect to the drapability and LBF.

The test data of the samples of the above-mentioned Comparative Examples are shown in Table 2.

the prepreg comprising the resin composition could not have both good releasability and good drapability. When the number of filaments constituting one carbon fiber bundle in the fabric is small, the fabric prepreg has poor drapability. Only when the thermoplastic resin in the resin composition is a high-molecular one, the prepreg comprising the resin composition could have good releasability, good drapability and high mechanical strength even though the amount of the thermoplastic resin in the resin composition is small. As a result, the flame retardancy of the cured products of the resin composition that contains a small amount of such a high-molecular thermoplastic resin is kept high.

Examples 6, 7

In a phenolic resin (Phenolite 1196 from Dai-Nippon Ink and Chemicals, having a nonvolatile content of 83%; or PL-4826 from Gun-ei Chemical, having a nonvolatile content of 78%) to be a base component, dispersed was 3 parts by weight, relative to 100 parts by weight of the solid content of the phenolic resin, of polyvinyl pyrrolidone (Luviskol K-90 from BASF Japan), at a temperature not higher than 30° C., and then kneaded under heat. The resulting mixture was cooled to be at a temperature not higher than 45° C., to which were added a predetermined amount of fine inorganic grains and a catalyst, and further kneaded to prepare a matrix resin. The properties of the resin compositions thus prepared herein are shown in Table 3, along with the components constituting the compositions. The resin matrix was coated on a release paper to form a resin film. The resin film was attached to the both surfaces of a woven fabric of carbon fibers, and pressed under heat to prepare an intermediate prepreg. The resin content of the intermediate prepreg was so controlled that the skin part from the prepreg in the honeycomb panel to be constructed herein could have a resin content of 41%. The intermediate prepregs were heated in an oven at 40° C. for 6 days to be woven fabric prepregs. These woven fabric prepregs both had good releasability and good drapability. Using the prepregs produced herein, honeycomb sandwich panels

TABLE 2

| | | Comparative Example | | | | |
|---|---|---|---|---|---|---|
| | | 1 | 2 | 3 | 4 | 5 |
| Carbon Fiber Fabric | | A | A | A | A | B |
| Phenolic Resin | Phenolite 1196 | 100 | 100 | 100 | 100 | 100 |
| Thermoplastic Resin | Polyvinyl Pyrrolidone (low-molecular product) | 0 | 0 | 3 | 10 | 10 |
| | Polyvinyl Pyrrolidone | 0 | 0 | 0 | 0 | 0 |
| | Polyethylene Glycol | 0 | 0 | 0 | 0 | 0 |
| | Polyvinyl Butyral | 0 | 0 | 0 | 0 | 0 |
| Fine Inorganic Grains | Calcium Carbonate | 4 | 4 | 4 | 4 | 4 |
| | Magnesium Oxide | 0.4 | 4 | 0.4 | 0.4 | 0.4 |
| Cover Factor (%) | | — | 89 | — | 92 | 90 |
| Releasability (Grade) | | 1 | 4 | 1 | 3 | 3 |
| Flexural Modulus (kgf/mm$^2$) | | — | 247 | — | 131 | 234 |
| CDP (in-lb/3 in) | | — | 3.9 | — | 4.3 | 4.0 |
| LBF (ksi) | | — | 21 | — | 23 | 21 |
| Surface Smoothness ($\mu$m) | | 128 | 108 | 101 | 92 | 97 |
| Self-extinguishing Time (sec) | | — | 0 | — | 23 | 25 |

As is obvious from Table 2, when the resin composition does not contain a thermoplastic resin or when the thermoplastic resin in the resin composition is a low molecular one, were formed through press fabrication. These were tested for CDP. The test data are shown in Table 3, along with the resin compositions prepared and used herein.

TABLE 3

|  |  | Example | | Comparative Example | | |
|---|---|---|---|---|---|---|
|  |  | 6 | 7 | 6 | 7 | 8 |
| Phenolic Resin | Phenolite 1196 | 100 | 0 | 100 | 0 | 100 |
|  | PL-4826 | 0 | 100 | 0 | 100 | 0 |
| Thermoplastic Resin | Polyvinyl Pyrrolidone | 3 | 3 | 3 | 3 | 3 |
| Fine Inorganic Grains | Clay | 4 | 4 | 4 | 4 | 4 |
| Catalyst | Ethyl Tosylate | 0.5 | 0.5 | 0 | 0 | 0 |
|  | P-toluenesulfonic Acid | 0 | 0 | 0 | 0 | 0.2 |
| Curastometry | Saturation Time (min) | 5 | 7 | 30 | 15 | 2 |
|  | Saturation Torque (N·m) | 10 | 7 | 1 | 2 | 6 |
|  | Rise Time (min) | 2 | 3 | 5 | 3 | 0 |
|  | Rise Torque (N·m) | 0.2 | 0.1 | 0.1 | 0.1 | 0 |
| pH | Initial Value | 5.7 | 6.3 | 5.7 | 6.3 | 1.8 |
|  | After 2 hours at 70° C. | 4.8 | 5.1 | 5.8 | 6.3 | — |
|  | After 6 minutes at 120° C. | 1.9 | 3.0 | 5.5 | 6.2 | — |
| Viscosity Change for 2 hours at 70° C. (times) |  | 1.9 | 2.7 | 1.9 | 2.5 | — |
| Panel fabrication ability |  | good | good | not good | not good | not good |
| CDP (in-lb/3 in) |  | 9.5 | 7.8 | — | — | — |

As is obvious from Table 3, the phenolic resin compositions of Examples 6 and 7, to which had been added ethyl tosylate having high latent potency, both had good stability and good panel fabrication ability, and the panels of the compositions had high adhesive strength.

Comparative Examples 6 to 8

As is obvious from Table 3, the resin compositions of Comparative Examples 6 and 7, to which no catalyst had been added, had good stability, but their torque in curastometry was extremely low. In addition, the moldings of the compositions peeled. On the other hand, the stability of the resin composition of Comparative Example 8, to which the catalyst added had no latent potency, was extremely bad even though the amount of the catalyst added thereto was small. The composition could be molded, but the adhesive strength of the resulting panel was extremely low.

INDUSTRIAL APPLICABILITY

The phenolic resin composition for fiber-reinforced composite materials of the invention can be well impregnated into reinforcing fibers to prepare practicable prepregs. The prepregs have good releasability, good drapability, high mechanical strength and good flame retardancy, and are favorable to various applications for aircraft materials, sports and leisure goods, vehicles, ships, civil engineering materials and construction materials.

What is claimed is:

1. A phenolic resin composition for the fiber-reinforced composite materials, which comprises at least resin component (A) and a thermoplastic resin component (B) having a weight-average molecular weight of from 300,000 to 3,000,000:
    phenolic resin,
    at least one thermoplastic resin selected from polyvinyl formals, polyvinyl acetals, polyvinyl butyrals, polyvinyl pyrrolidones, polyvinyl acetates, polyvinyl alcohols, polyethylene glycols, copolymerized nylons and dimer acid polyamides.

2. The phenolic resin composition for fiber-reinforced composite materials as claimed in claim 1, wherein said component (B) is soluble in said phenolic resin.

3. The phenolic resin composition for fiber-reinforced composite materials as claimed in claim 1 or 2, wherein said component (B) is in an amount of from 0.1 to 10 parts by weight relative to 100 parts by weight of the nonvolatile content of said phenolic resin composition.

4. The phenolic resin composition for fiber-reinforced composite materials as claimed in claim 1, further comprising an acid-generation agent.

5. The phenolic resin composition for fiber-reinforced composite materials as claimed in claim 1, wherein said phenolic resin is an aqueous resol resin.

6. A phenolic resin composition for fiber-reinforced composite materials comprising at least resin component (A) and a thermoplastic resin component (B) having a weight-average molecular weight of from 300,000 to 3,000,000, which is characterized in that, in its torque-time saturation curve as plotted in curastometry at 130 to 160° C., the saturation time for the torque falls between 3 and 10 minutes and the torque within the saturation time falls between 3 and 30 N·m.

7. The phenolic resin composition for fiber-reinforced composite materials as claimed in claim 6, which is such that, in its curastometric torque-time saturation curve as plotted in curastometry at 130 to 160° C., the torque rise time falls between 1/5 and 4/5 of the saturation time and the torque at the rise time falls between 0 and 1 N·m.

8. The phenolic resin composition for fiber-reinforced composite materials as claimed in claim 6 or 7, of which the pH falls between 4 and 7.

9. The phenolic resin composition for fiber-reinforced composite materials as claimed in claim 6, in which the viscosity change for 2-hours at 70° C. is at most 3 times, and the pH change after 2 hours at 70° C. falls between 0 and 2.

10. The phenolic resin composition for fiber-reinforced composite materials as claimed in claim 6, in which the pH change after 6 minutes at 120° C. is at least 3.

11. A prepreg for fiber-reinforced composite materials, which comprises at least the following component [A], [B] of a resin having a weight-average molecular weight of from 300,000 to 3,000,000, and [C]:
    [A]: phenolic resin,
    [B]: at least one resin selected from polyvinyl formals, polyvinyl acetals, polyvinyl butyrals, polyvinyl pyrrolidones, polyvinyl acetates, polyvinyl alcohols, polyethylene glycols, copolymerized nylons and dimer acid polyamides,
    [C]: reinforcing fibers.

12. The prepreg for fiber-reinforced composite materials as claimed in claim 11, wherein said component (A) is an aqueous resol resin.

13. The prepreg for fiber-reinforced composite materials as claimed in claim 11 or 12, wherein said component (C) is continuous fibers.

14. The prepreg for fiber-reinforced composite materials as claimed in claim 11, wherein said component (C) contains at least carbon fibers.

15. The prepreg for fiber-reinforced composite materials as claimed in claim 11, wherein said component (C) is fibers having a circular cross-sectional profile.

16. The prepreg for fiber-reinforced composite materials as claimed in claim 11, wherein said component (C) is in the form of fiber bundles and the number of filaments constituting one said fiber bundle falls between 6,000 and 30,000.

17. The prepreg for fiber-reinforced composite materials as claimed in claim 11, wherein said component (C) is in the form of a sheet.

18. The prepreg for fiber-reinforced composite materials as claimed in claim 17, wherein said Sheet is a fabric.

19. The prepreg for fiber-reinforced composite materials as claimed in claim 11, of which the volatile content falls between 0.5 and 7.5% by weight.

20. The prepreg for fiber-reinforced composite materials as claimed in claim 11, for which the gelling time at 160° C. falls between 20 and 150 seconds.

21. The prepreg for fiber-reinforced composite materials as claimed in claim 11, which has a resin flow of from 5 to 35%.

22. A woven fabric prepreg comprising, as indispensable constituent elements, carbon fibers and a phenolic resin, which has a volatile content of from 0.5 to 7.5% by weight and has a cover factor of at least 93%.

23. The woven fabric prepreg as claimed in claim 22, of which the lowermost viscosity is at most 50,000 poises.

24. The woven fabric prepreg as claimed in claim 22 or 23, wherein said carbon fibers have a substantially circular cross-sectional profile.

25. The woven fabric prepreg as claimed in claim 22, wherein the fabric constituting the prepreg comprises carbon fiber bundles and wherein the number of filaments constituting one said carbon fiber bundle falls between 6,000 and 30,000.

26. A method for producing a prepreg for fiber-reinforced composite materials, which comprises filmwise applying the phenolic resin composition of claim 1 to reinforcing fibers followed by heating the resulting film under pressure to thereby impregnate it into the reinforcing fibers.

27. The method for producing a prepreg for fiber-reinforced composite materials as claimed in claim 26, wherein said prepreg has a volatile content of from 0.5 to 7.5% by weight.

28. The method for producing a prepreg for fiber-reinforced composite materials as claimed in claim 26 or 27, wherein the gelling time for said prepreg at 60° C. falls between 20 and 150 seconds.

29. The method for producing a prepreg for fiber-reinforced composites materials as claimed in claim 26, wherein said prepreg has a resin flow of from 5 to 35%.

30. The method for producing a prepreg for fiber-reinforced composite materials as claimed in claim 26, wherein at least 50% by weight of the volatile content of said prepreg is water.

* * * * *

UNITED STATES PATENT AND TRADEMARK OFFICE
CERTIFICATE OF CORRECTION

PATENT NO.   : 6,391,959 B1  
DATED        : May 21, 2002  
INVENTOR(S)  : Ninomiya et al.

Page 1 of 1

It is certified that error appears in the above-identified patent and that said Letters Patent is hereby corrected as shown below:

<u>Column 13,</u>
Line 63, please change "PEP" to -- FEP --.

<u>Column 16,</u>
Table 1, Example 4, row 5, please change "5" to -- 0 --.
Example 5, row 5, please change "0" to -- 5 --.

<u>Column 22,</u>
Line 21, please change "60º C" to -- 160º C --.

Signed and Sealed this

Twenty-second Day of October, 2002

Attest:

Attesting Officer

JAMES E. ROGAN
Director of the United States Patent and Trademark Office